United States Patent
Kennedy

(10) Patent No.: US 8,635,171 B1
(45) Date of Patent: Jan. 21, 2014

(54) SYSTEMS AND METHODS FOR REDUCING FALSE POSITIVES PRODUCED BY HEURISTICS

(75) Inventor: Mark Kennedy, Redondo Beach, CA (US)

(73) Assignee: Symantec Corporation, Mountain View, CA (US)

( * ) Notice: Subject to any disclaimer, the term of this patent is extended or adjusted under 35 U.S.C. 154(b) by 1031 days.

(21) Appl. No.: 12/542,099

(22) Filed: Aug. 17, 2009

(51) Int. Cl.
*G06F 15/18* (2006.01)

(52) U.S. Cl.
USPC .................................. 706/12; 726/23; 726/24

(58) Field of Classification Search
USPC ........................................................... 706/13
See application file for complete search history.

(56) References Cited

U.S. PATENT DOCUMENTS

| 6,067,535 | A | 5/2000 | Hobson et al. | |
| 7,099,504 | B2 * | 8/2006 | Blake et al. | 382/159 |
| 7,436,980 | B2 * | 10/2008 | Sigal et al. | 382/103 |
| 7,707,129 | B2 * | 4/2010 | Zhuang et al. | 706/20 |
| 8,280,830 | B2 | 10/2012 | Kennedy | |
| 8,356,354 | B2 * | 1/2013 | Nazarov | 726/25 |
| 2007/0239638 | A1 * | 10/2007 | Zhuang et al. | 706/20 |
| 2009/0044272 | A1 * | 2/2009 | Jarrett | 726/23 |

OTHER PUBLICATIONS

Takahashi, F.; Abe, S.;, "Decision-tree-based multiclass support vector machines," Neural Information Processing, 2002. ICONIP '02. Proceedings of the 9th International Conference on, vol. 3, no., pp. 1418-1422 vol. 3, Nov. 18-22, 2002.*
Xuchu Li, et al., AdaBoost with SVM-based component clsasifiers, Engineering Applications of Artificial Intelligence, vol. 21 (2008), pp. 785-795, Available Online, Sep. 14, 2007.*
Pietersma, Diederik et al.; "Induction and Evaluation of Decision Trees for Lactation Curve Analysis;" Science Direct; Dec. 17, 2002.
Search Report and Written Opinion Received in related International Application No. PCT/US2010/046440; Dec. 16, 2010.
Shlomo Hershkop et al.; Combining Email Models for False Positive Reduction; KDD '05 Proceedings of the eleventh ACM SIGKDD international conference on Knowledge discovery in data mining; Dec. 31, 2005; pp. 98-107.
William Arnold et al.; Automatically Generated WIN32 Heuristic Virus Detection; Virus Bulletin Conference; Sep. 30, 2000; pp. 51-60.
Ender Ozcan et al.; A Comprehensive Analysis of Hyper-heuristics; Journal Intelligent Data Analysis; Jan. 31, 2008; vol. 12, No. 1.

* cited by examiner

*Primary Examiner* — Jeffrey A Gaffin
*Assistant Examiner* — David H Kim
(74) *Attorney, Agent, or Firm* — ALG Intellectual Property, LLC

(57) ABSTRACT

An exemplary method for reducing false positives produced by heuristics may include: 1) training a heuristic using a set of training data, 2) deploying the heuristic, 3) identifying false positives produced by the heuristic during deployment, and then 4) tuning the heuristic by: a) duplicating at least a portion of the false positives, b) modifying the training data to include the duplicate false positives, and c) re-training the heuristic using the modified training data. Corresponding systems and computer-readable media are also disclosed.

20 Claims, 6 Drawing Sheets

SYSTEMS AND METHODS FOR REDUCING FALSE POSITIVES PRODUCED BY HEURISTICS

BACKGROUND

Decision trees and other heuristics are commonly used as predictive models to map observations about an item with conclusions about the item's target value. For example, a security-software vendor may use decision trees as predictive models for identifying malicious computer files ("malware") based on attributes, characteristics, and/or behaviors of the files.

Decision trees and other heuristics may be trained and refined using a corpus of known samples. For example, a security-software vendor may train a malware-detection heuristic by applying the heuristic to a corpus of samples containing known-malicious files and known-legitimate files.

The accuracy of a heuristic is often limited by the size of the corpus of samples used to train the heuristic. As such, heuristics commonly generate false negatives and/or false positives upon being deployed and used in the real world. In order to improve the accuracy of a heuristic, heuristic providers typically: 1) add the misclassified samples to the corpus of samples used to train the heuristic, 2) re-train the heuristic using the modified corpus of samples, and then 3) redeploy the re-trained heuristic.

Unfortunately, many of the machine-learning techniques used to create and train heuristics tolerate a certain degree of error. For example, a malware-detection heuristic that generates less than a 0.01% false-positive rate may be deemed acceptable. Thus, even if a heuristic is re-trained using a corpus of samples that includes misclassified samples gathered from the field, there is no guarantee that this re-trained heuristic will exclude the precise combination of behaviors that resulted in the misclassifications that the heuristic provider hoped to avoid by re-training the heuristic. In order to address this problem, heuristic providers may attempt to modify the underlying algorithms or formulas used to create or train the heuristic, which may represent a prohibitively costly and/or lengthy undertaking. As such, the instant disclosure identifies a need for systems and methods for quickly and effectively reducing the number of false positives generated by heuristics.

SUMMARY

As will be described in greater detail below, the instant disclosure generally relates to systems and methods for reducing false positives produced by heuristics. In one example, the systems and methods disclosed herein may accomplish this task by: 1) training a heuristic (such as a malware-detection decision tree) using a set of training data, 2) deploying the heuristic, 3) identifying false positives produced by the heuristic in the field (i.e., during deployment), and then 4) tuning or refining the heuristic by: a) duplicating at least a portion of the false positives produced in the field, b) modifying the training data to include the duplicate false positives, and then c) re-training the heuristic using the modified training data.

In some examples, the systems disclosed herein may duplicate the false positives until they equal the number of true positives produced in the field. In addition, in some examples re-training the heuristic may result in the creation of a new heuristic, which heuristic may then be deployed in the field.

By duplicating at least a portion of the false positives produced by a heuristic in the field, the systems and methods disclosed herein may effectively amplify or magnify the weight given to such false positives. In addition, by including these duplicates within the corpus of training data used to tune a heuristic, the systems and methods described herein may enable software developers to quickly and effectively reduce the number of false positives produced by heuristics without having to modify the underlying algorithms or formulas used to create such heuristics. As such, these systems and methods may improve the overall accuracy of heuristics without significantly increasing development time.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
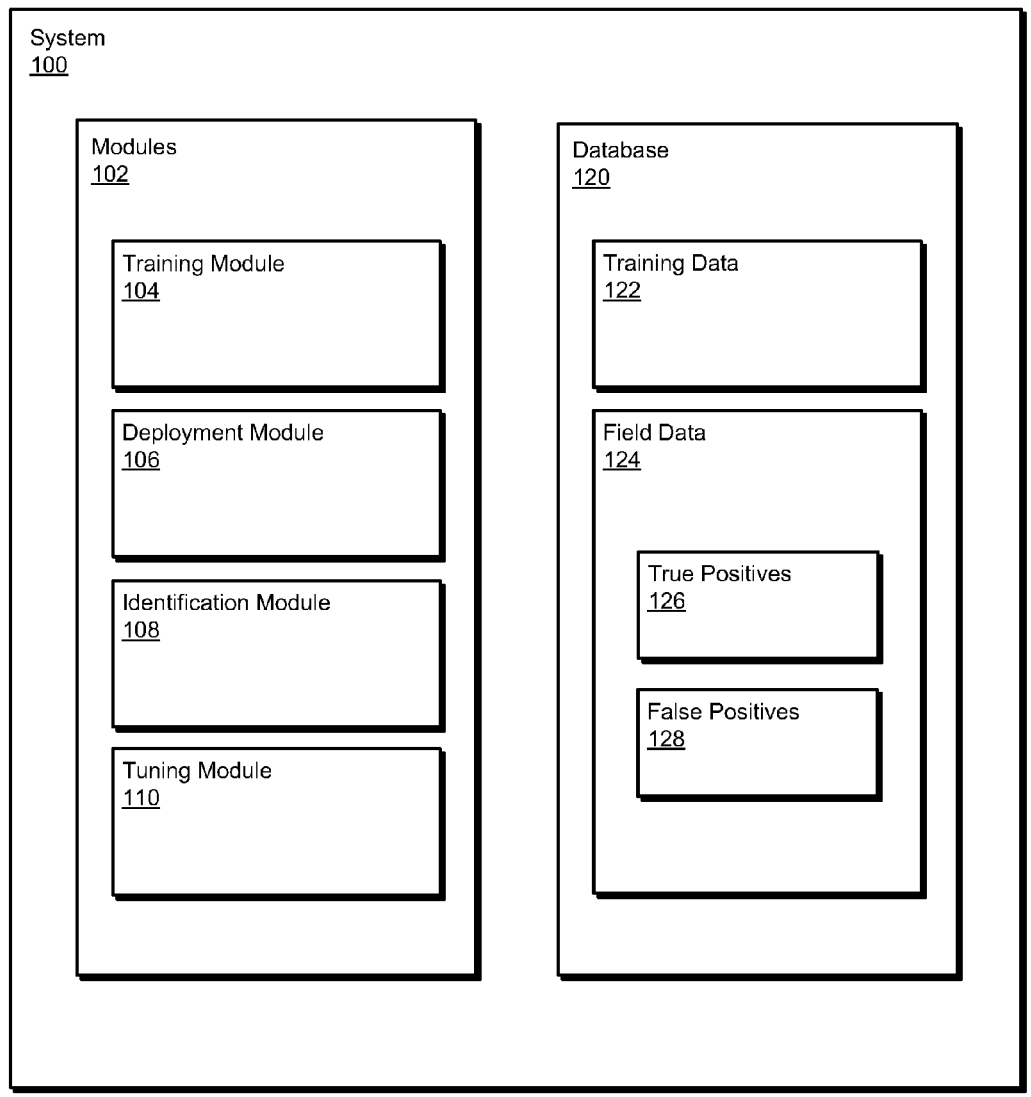
FIG. 1 is a block diagram of an exemplary system for reducing false positives produced by heuristics.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for reducing false positives produced by heuristics. In one example, the systems and methods disclosed herein may accomplish this task by: 1) training a heuristic (such as a malware-detection decision tree) using a set of training data, 2) deploying the heuristic, 3) identifying false positives produced by the heuristic in the field (i.e., during deployment), and then 4) tuning or refining the heuristic by: a) duplicating at least a portion of the false positives produced in the field, b) modifying the training data to include the duplicate false positives, and then c) re-training the heuristic using the modified training data.

The term "heuristic algorithm," or often simply "heuristic," as used herein, generally refers to any type or form of algorithm, formula, model, or tool that may be used to classify, or make decisions with respect to, an object or sample. In some examples, the various heuristics described herein may represent, without limitation, decision trees and other algorithms designed to detect and/or identify malware.

In addition, the terms "false positive" and "true positive" generally represent possible outcomes of a decision process, such as a heuristic. In particular, a "false positive" may represent an error made in rejecting a null hypothesis when the null hypothesis is actually true. For example, a malware-detection heuristic may produce a false positive by incorrectly determining that a legitimate file or software application is malicious. Conversely, a "true positive" may represent a correct decision in accepting a null hypothesis as true. For example, a malware-detection heuristic may produce a true positive by correctly determining that a legitimate file or software application is legitimate.

Figure 2:
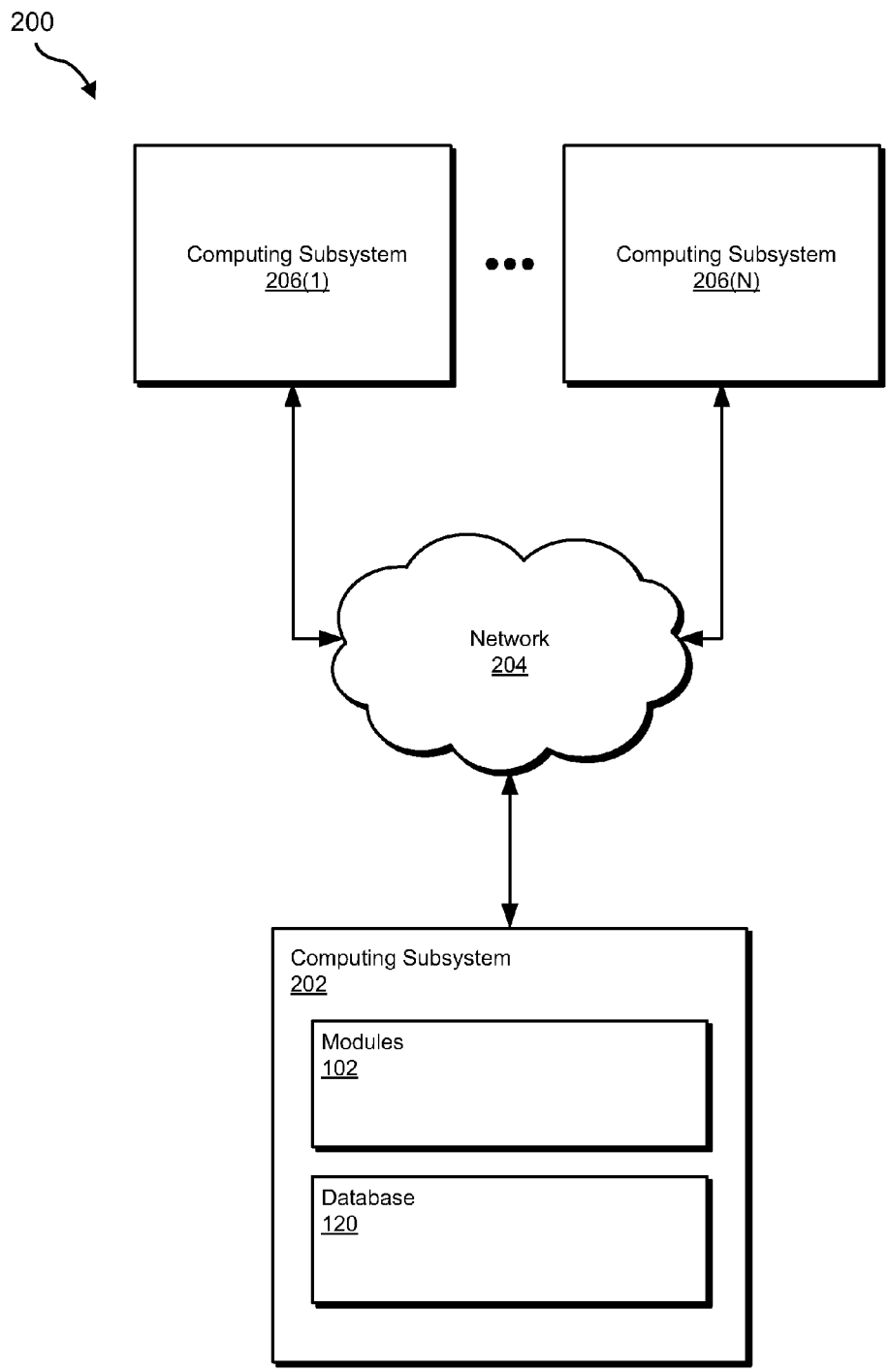
FIG. 2 is a block diagram of an exemplary system for reducing false positives produced by heuristics.

The following will provide, with reference to FIGS. 1-2, detailed descriptions of exemplary systems for reducing false positives produced by heuristics. Detailed descriptions of corresponding computer-implemented methods will also be provided in connection with FIGS. 3-4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for reducing false positives produced by heuristics. As illustrated in this figure, exemplary system 100 may include one or more modules 102 for performing one or more tasks. For example, and as will be explained in greater detail below, exemplary system 100 may include a training module 104 programmed to train heuristics. Exemplary system 100 may also include deployment module 106 programmed to deploy heuristics within a community or enterprise.

In addition, and as will be described in greater detail below, exemplary system 100 may include an identification module 108 programmed to identify false positives and true positives produced by heuristics during deployment. Exemplary system 100 may also include a tuning module programmed to: 1) duplicate at least a portion of the false positives, 2) modify the training data to include the duplicate false positives, and 3) re-train the heuristic using the modified training data. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing subsystems 202 and 206(1)-206(N)), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases 120. Database 120 may represent a portion of a single database or computing device or a plurality of databases or computing devices. In one embodiment, database 120 may be configured to store training data 122 and field data 124. As will be explained in greater detail below, training data 122 may represent a corpus of known samples that may be used to train heuristics. In contrast, field data 124 may represent data (gathered from computing systems on which a heuristic has been deployed) that identifies or contains: 1) a corpus of samples classified by the heuristic and/or 2) classifications assigned to these samples by the heuristic.

Database 120 in FIG. 1 may represent a portion of one or more computing devices. For example, database 120 may represent a portion of computing subsystems 202 and 206(1)-206(N) in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as computing subsystems 202 and 206(1)-206(N) in FIG. 2, computing system 510 in FIG. 5, and/or portions of exemplary network architecture 600 in FIG. 6.

Exemplary system 100 in FIG. 1 may be deployed in a variety of ways. For example, all or a portion of exemplary system 100 may represent portions of a cloud-computing or network-based environment, such as exemplary system 200 illustrated in FIG. 2. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

As shown in FIG. 2, exemplary system 200 may include a computing subsystem 202 in communication with computing subsystems 206(1)-206(N) via a network 204. In one embodiment, and as will be described in greater detail below, modules 102 on computing device 202 may be programmed to: 1) train a heuristic using a set of training data, 2) deploy the heuristic, 3) identify false positives produced by the heuristic during deployment (e.g., on computing subsystems 206(1)-206(N), as explained below), and then 4) tune the heuristic by: a) duplicating at least a portion of the false positives, b) modifying the training data to include the duplicate false positives, and then c) re-training the heuristic using the modified training data.

Computing subsystems 202 and 206(1)-206(N) generally represent any type or form of computing device capable of reading computer-executable instructions. Examples of computing subsystems 202 and 206(1)-206(N) include, without limitation, laptops, desktops, servers (application servers and database servers configured to provide various database services and/or run certain software applications), cellular phones, personal digital assistants (PDAs), multimedia players, embedded systems, combinations of one or more of the same, exemplary computing system 510 in FIG. 5, or any other suitable computing device.

In one example, computing subsystem 202 may represent a server or backend configured to train and deploy heuristics to computing subsystems 206(1)-206(N). In this example, computing subsystems 206(1)-206(N) may represent all or a portion of a single community or a plurality of communities. For example, computing subsystems 206(1)-206(N) may represent computing systems within a single or a plurality of user bases, a single or a plurality of enterprises, or portions or combinations of one or more of the same.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing subsystems 202 and 206(1)-206(N).

Figure 3:
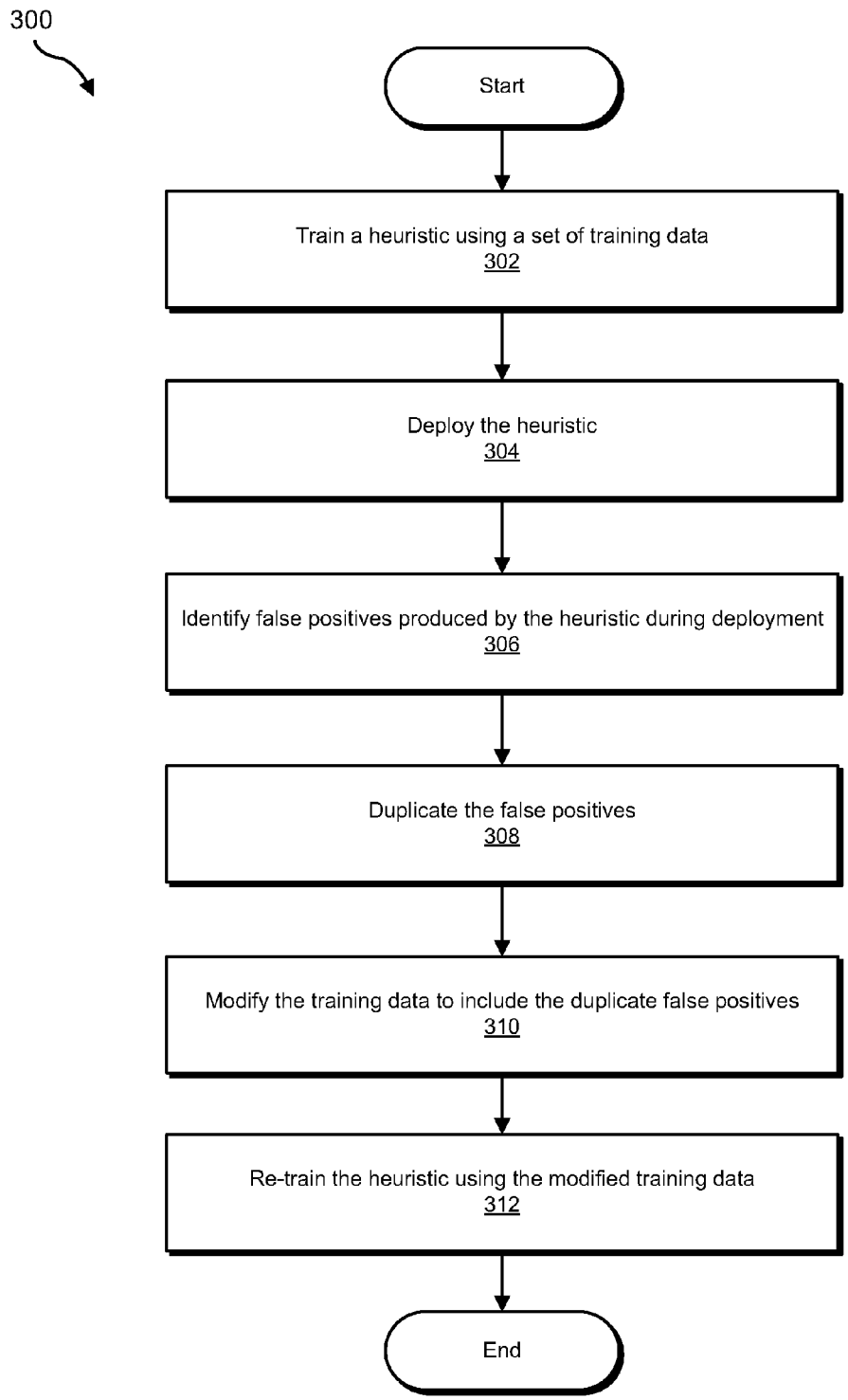
FIG. 3 is a flow diagram of an exemplary method for reducing false positives produced by heuristics.

FIG. 3 is a flow diagram of an exemplary computer-implemented method 300 for reducing false positives produced by heuristics. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

At step 302 in FIG. 3, one or more of the systems described herein may train a heuristic using a set of training data. For example, training module 104 in FIG. 1 (which may, as detailed above, represent a portion of computing subsystem 202 in FIG. 2) may train a heuristic using training data 122. As detailed above, this heuristic may represent any type or form of decision-based algorithm. In some examples, this heuristic may represent a malware-detection heuristic (such as a decision tree) configured to detect and identify malware.

Training module 104 may train heuristics in a variety of ways. For example, training module 104 may apply an initial version of a heuristic to a corpus of known samples (e.g., training data 122, which may represent a corpus of samples containing known-malicious files and known-legitimate files) in a controlled environment, such as a computer lab. Training module 104 may then determine whether the heuristic correctly classified each sample within the corpus of known samples. If training module 104 determines that the heuristic misclassified an unacceptable number of samples within training data 122, then training module 104 may tweak or modify the underlying algorithm of the heuristic in an attempt to improve its accuracy. Training module 104 may then repeat this process until an acceptable accuracy rate is achieved.

Returning to FIG. 3, at step 304 the various systems described herein may deploy the heuristic trained in step 302. For example, deployment module 106 in FIG. 1 (which may, as detailed above, represent a portion of computing subsystem 202 in FIG. 2) may deploy the heuristic trained in step 302 from computing subsystem 202 to one or more of computing subsystems 206(1)-206(N) via network 204.

As detailed above, in one example computing subsystem 202 may represent a server or backend configured to train and deploy heuristics to computing subsystems 206(1)-206(N). In this example, computing subsystems 206(1)-206(N) may represent all or a portion of a single community or a plurality of communities. For example, computing subsystems 206(1)-206(N) may represent computing systems within a single or a plurality of user bases, a single or a plurality of enterprises, or portions or combinations of one or more of the same.

At step 306, the various systems described herein may identify false positives produced by the heuristic during deployment. For example, identification module 108 (which may, as detailed above, represent a portion of computing subsystem 202 in FIG. 2) may identify false positives produced when the heuristic trained in step 302 is deployed on computing subsystems 206(1)-206(N).

Identification module 108 may identify false positives produced by heuristics during deployment in a variety of ways, including using any of a variety of conventional techniques known in the art. In one example, identification module 108 may receive information (e.g., from the systems in the field on which the heuristic has been deployed) that identifies both the various samples classified by the heuristic and the classifications assigned to these samples by the heuristic. In some cases, this information may also include copies of the samples themselves. Identification module 108 may then analyze this field data in order to determine whether the heuristic correctly classified each sample. In particular, identification module 108 may analyze this field data in order to determine whether the heuristic produced any false positives.

For example, identification module 108 may, as part of computing subsystem 202, receive field data 124 from computing subsystems 206(1)-206(N). In the case of a malware-detection heuristic, field data 124 may identify or contain: 1) the various files on computing subsystems 206(1)-206(N) that were classified by the malware-detection heuristic and 2) the classifications (e.g., "legitimate" or "malicious") that were assigned to these files by the malware-detection heuristic.

Identification module 108 may then analyze field data 124 to determine whether the malware-detection heuristic correctly classified each file. During this analysis, identification module 108 may identify true positives (e.g., legitimate files that were correctly classified as legitimate) and false positives (e.g., legitimate files that were incorrectly classified as malicious) produced by the malware-detection heuristic.

Returning to FIG. 3, at step 308 the system may begin tuning the heuristic by duplicating at least a portion of the false positives identified in step 306. For example, tuning module 110 in FIG. 1 (which may, as detailed above, represent a portion of computing subsystem 202 in FIG. 2) may duplicate at least a portion of the false positives 128 produced by the heuristic in the field (i.e., during deployment).

Tuning module 110 may perform step 308 in a variety of ways. In one example, tuning module 110 may duplicate false positives 128 until the number of false positives 128 is equal to the number of true positives 126 gathered from the field (i.e., the number of true positives 126 within field data 124). In other examples, tuning module 110 may duplicate false positives 128 until the number of false positives 128 is less than or exceeds the number of true positives 126 in field data 124.

At step 310, the system may modify the training data to include the duplicate false positives. For example, tuning module 110 in FIG. 1 may modify training data 122 to include the duplicate false positives from step 308.

Figure 4:
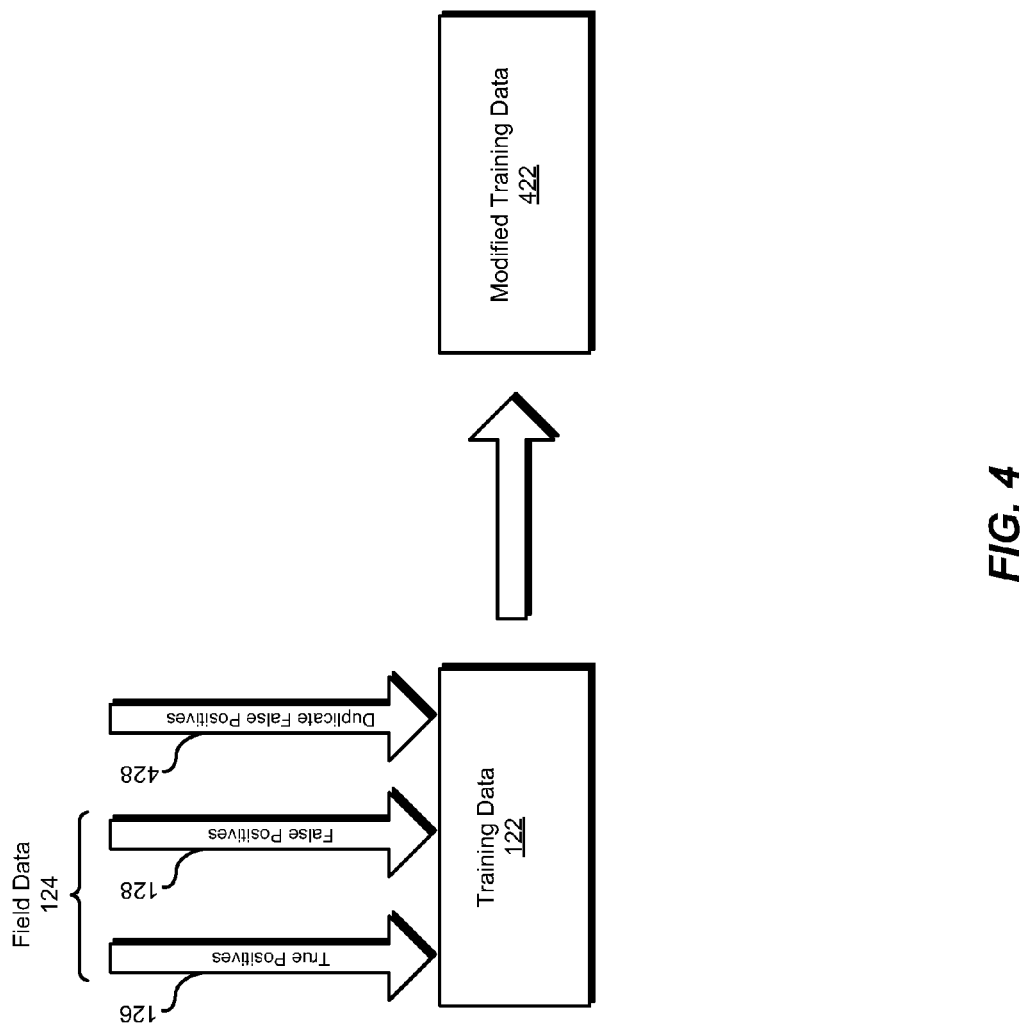
FIG. 4 is a block diagram of an exemplary process for modifying training data to include duplicate false positives.

As detailed above, in some embodiments tuning module 110 may modify training data 122 to include an equal number of false positives and true positives. For example, as illustrated in FIG. 4, tuning module 110 may add the true positives 126 and false positives 128 from field data 124 into the original corpus of samples comprising training data 122. Tuning module 110 may then add the duplicate false positives 428 created in step 308 into training data 122, resulting in modified training data 422. As detailed above, the number of false positives 128 and duplicate false positives 428 may, collectively, be less than, equal to, or greater than the number of true positives 126 included in modified training data 422.

Returning to FIG. 3, at step 312 the system may re-train the heuristic using the modified training data. For example, tuning module 110 from FIG. 1 may re-train the heuristic using modified training data 422 (which may, as detailed above, contain duplicate false positives 428), in the manner detailed above in connection with step 302. Upon completion of step 312, exemplary method 300 in FIG. 3 may terminate.

In some examples, tuning module 110 may tune the heuristic without modifying the underlying algorithm or formula (including any weighting formulas) used to create the heuristic. As such, by effectively amplifying or overweighting the false positives produced by a heuristic, the machine-learning techniques used to create and train the heuristic may be forced to account for these false positives when re-training the heuristic using modified training data 422. Thus, tuning module 110 may be able to quickly and efficiently increase the overall accuracy and effectiveness of the heuristic without having to modify the various algorithms or formulas used to create the heuristic.

In some examples, re-training the heuristic using modified training data 422 may result in the creation of a new (or second) heuristic. In this example, deployment module 106 may cause computing subsystem 202 to deploy this new heuristic to computing subsystems 206(1)-206(N) via network 204.

By duplicating at least a portion of the false positives produced by a heuristic in the field, the systems and methods disclosed herein may effectively amplify or magnify the weight given to such false positives. In addition, by including these duplicates within the corpus of training data used to tune a heuristic, the systems and methods described herein may enable software developers to quickly and effectively reduce the number of false positives produced by heuristics without having to modify the underlying algorithms or formulas used to create such heuristics. As such, these systems and methods may improve the overall accuracy of heuristics without significantly increasing development time.

Figure 5:
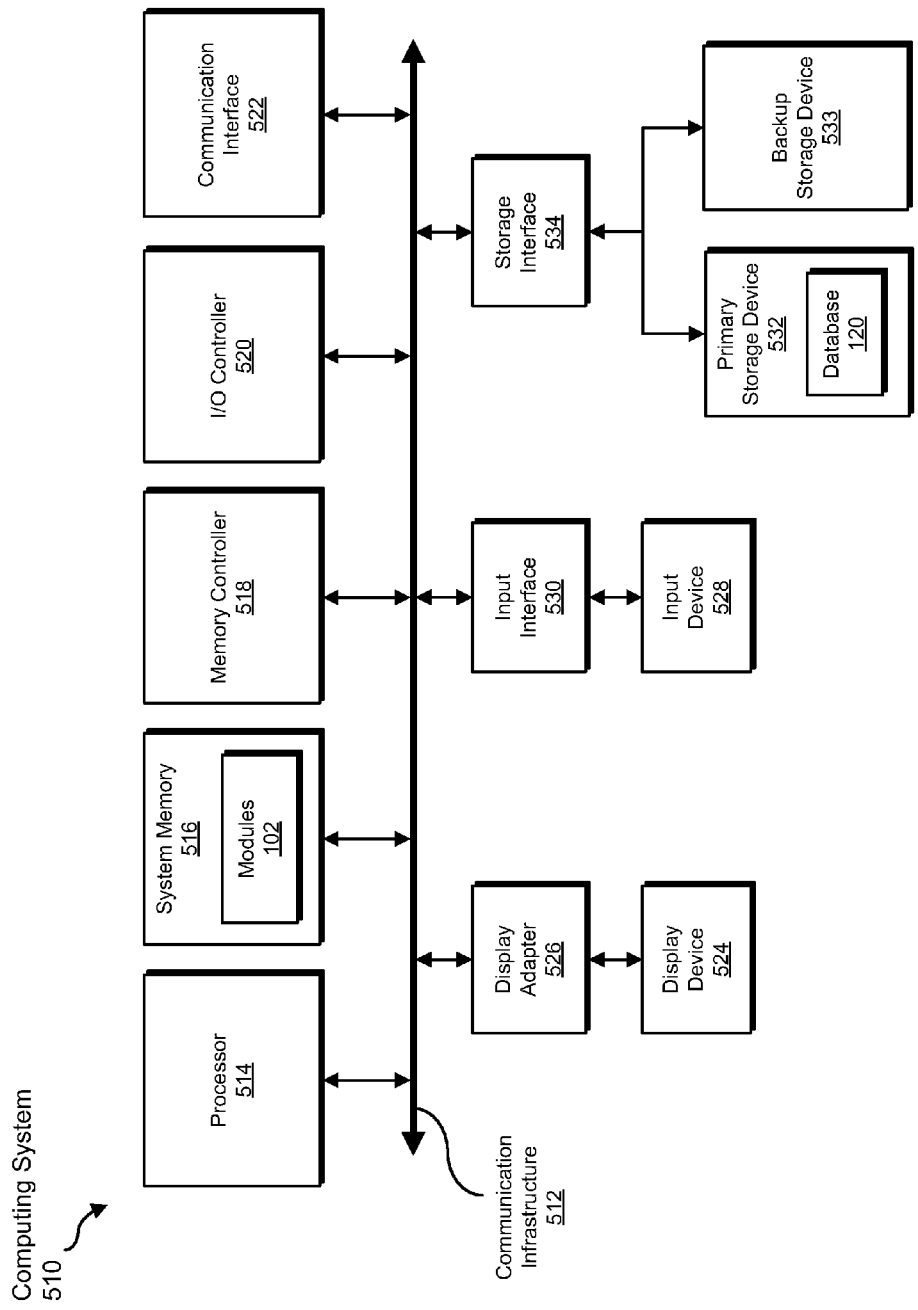
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the training, deploying, identifying, tuning, duplicating, modifying, re-training, and using steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller may perform and/or be a means for performing, either alone or in combination with other elements, one or more of the steps or features described and/or illustrated herein, such as training, deploying, identifying, tuning, duplicating, modifying, re-training, and using.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the training, deploying, identifying, tuning, duplicating, modifying, re-training, and using steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the training, deploying, identifying, tuning, duplicating, modifying, re-training, and using steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the training, deploying, identifying, tuning, duplicating, modifying, re-training, and using steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the training, deploying, identifying, tuning, duplicating, modifying, re-training, and using steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
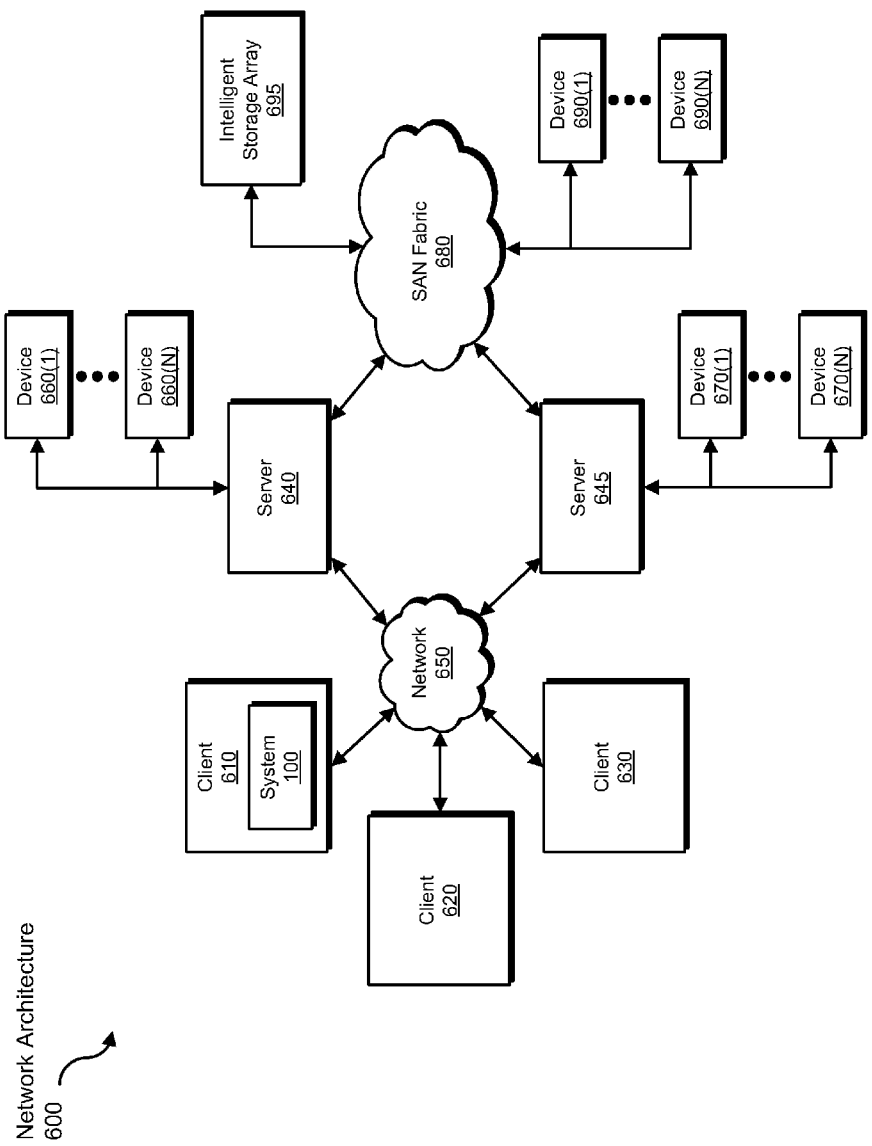
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. In one example, client system 610 may include system 100 from FIG. 1.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690 (1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the training, deploying, identifying, tuning, duplicating, modifying, re-training, and using steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for reducing false positives produced by heuristics. In one example, such a method may include: 1) training a heuristic using a set of training data, 2) deploying the heuristic, 3) identifying false positives produced by the heuristic during deployment, and then 4) tuning the heuristic by: a) duplicating at least a portion of the false positives, b) modifying the training data to include the duplicate false positives, and c) re-training the heuristic using the modified training data.

In one example, the method may also include identifying true positives produced by the heuristic during deployment. In this example, modifying the training data may also include modifying the training data to also include the false positives and the true positives.

In some examples, modifying the training data may include modifying the training data to include an equal number of false positives and true positives. In addition, re-training the heuristic using the modified training data may result in the creation of a second heuristic. In this example, the method may also include deploying the second heuristic.

In some examples, tuning the heuristic may include tuning the heuristic without modifying an algorithm used to create the heuristic. In addition, identifying false positives produced by the heuristic during deployment may include identifying false positives produced when applying the heuristic to field data. In one example, the heuristic may represent a malware-detection heuristic, such as a malware-detection decision-tree algorithm.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, tuning module 110 may transform a property or characteristic of database 120 by modifying and then storing training data 122 in database 120.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for reducing false positives produced by heuristics, at least a portion of the method being performed by a computing device comprising at least one processor, the method comprising:
   training a heuristic using a set of training data;
   deploying the heuristic;
   identifying false positives produced by the heuristic during deployment;
   determining that the false positives produced by the heuristic fall within a degree of error tolerated by the heuristic;
   in response to the determination that the false positives produced by the heuristic fall within the degree of error tolerated by the heuristic, tuning the heuristic to account for the false positives by:
      duplicating at least a portion of the false positives until the number of false positives is sufficiently amplified to force the heuristic to account for the false positives;
      modifying the training data to include the duplicate false positives;
      re-training the heuristic using the modified training data.

2. The method of claim 1, further comprising identifying true positives produced by the heuristic during deployment.

3. The method of claim 2, wherein modifying the training data further comprises modifying the training data to also include the false positives and the true positives.

4. The method of claim 1, wherein modifying the training data comprises modifying the training data to include an equal number of false positives and true positives.

5. The method of claim 1, wherein re-training the heuristic using the modified training data results in the creation of a second heuristic.

6. The method of claim 5, further comprising deploying the second heuristic.

7. The method of claim 1, wherein the heuristic comprises a malware-detection heuristic.

8. The method of claim 1, wherein the heuristic comprises a decision tree.

9. The method of claim 1, wherein tuning the heuristic comprises tuning the heuristic without modifying an algorithm used to create the heuristic.

10. The method of claim 1, wherein identifying false positives produced by the heuristic during deployment comprises identifying false positives produced when applying the heuristic to field data.

11. A system for reducing false positives produced by heuristics, the system comprising:
   a training module programmed to train a heuristic using a set of training data;
   a deployment module programmed to deploy the heuristic;
   an identification module programmed to:
      identify false positives produced by the heuristic during deployment;
      determine that the false positives produced by the heuristic fall within a degree of error tolerated by the heuristic;
   a tuning module programmed to, in response to the determination that the false positives produced by the heuristic fall within the degree of error tolerated by the heuristic, tune the heuristic to account for the false positives by:
      duplicating at least a portion of the false positives until the number of false positives is sufficiently amplified to force the heuristic to account for the false positives;
      modifying the training data to include the duplicate false positives;
      re-training the heuristic using the modified training data;
   a processor configured to execute the training module, the deployment module, the identification module, and the tuning module.

12. The system of claim 11, wherein the identification module is further programmed to identify true positives produced by the heuristic during deployment.

13. The system of claim 12, wherein the tuning module modifies the training data by modifying the training data to also include the false positives and the true positives.

14. The system of claim 11, wherein the tuning module modifies the training data by modifying the training data to include an equal number of false positives and true positives.

15. The system of claim 11, wherein re-training the heuristic using the modified training data results in the creation of a second heuristic.

16. The system of claim 15, wherein the deployment module is further programmed to deploy the second heuristic.

17. The system of claim 11, wherein the heuristic comprises a malware-detection heuristic.

18. The system of claim 11, wherein the tuning module tunes the heuristic by tuning the heuristic without modifying an algorithm used to create the heuristic.

19. The system of claim 11, wherein the identification module identifies the false positives produced by the heuristic during deployment by identifying false positives produced when applying the heuristic to field data.

20. A non-transitory computer-readable medium comprising computer-executable instructions that, when executed by at least one processor of a computing device, cause the computing device to:
   train a heuristic using a set of training data;
   deploy the heuristic;
   identify false positives produced by the heuristic during deployment;
   determine that the false positives produced by the heuristic fall within a degree of error tolerated by the heuristic;
   in response to the determination that the false positives produced by the heuristic fall within a degree of error tolerated by the heuristic, tune the heuristic to account for the false positives by:
      duplicating at least a portion of the false positives until the number of false positives is sufficiently amplified to force the heuristic to account for the false positives;
      modifying the training data to include the duplicate false positives;
      re-training the heuristic using the modified training data.

* * * * *